United States Patent

[11] 3,569,816

[72] Inventor Joseph M. Marzolf
    Falls Church, Va.
[21] Appl. No. 815,707
[22] Filed Apr. 14, 1969
[45] Patented Mar. 9, 1971
[73] Assignee the United States of America as represented by the Secretary of the Navy

[54] CONSTANT OUTPUT VOLTAGE DC TO DC CONVERTER
8 Claims, 4 Drawing Figs.

[52] U.S. Cl. .................................................. 321/2,
    321/16, 331/47, 331/113.1
[51] Int. Cl. ................................................... H02m 3/22,
    H03b 3/14, H03k 3/281
[50] Field of Search .......................................... 321/2, 16;
    331/46, 47, 55, 113.1

[56] References Cited
UNITED STATES PATENTS
3,219,906 11/1965 Keller et al. ................... 321/2X
3,305,756 2/1967 Dossetal ...................... 321/2
3,345,580 10/1967 Tracy ........................... 331/55X FOREIGN PATENTS
580,889 8/1959 Canada ......................... 321/2

Primary Examiner—William H. Beha, Jr.
Attorneys—A.L. Branning and R. S. Sciascia ABSTRACT: A DC to DC converter for producing a constant voltage DC output signal which includes an unbalanced square-loop magnetic core inverter, a single silicon controlled rectifier for initiating a single complete cycle of said inverter upon the receipt of an input pulse signal, and a constant frequency pulse oscillator coupled to a control input of the silicon controlled output signal, which is subsequently half-wave rectified and filtered, each cycle of which having a constant average voltage amplitude. The frequency of the pulse oscillator is lower than the free-running frequency of the inverter, thereby producing an output pulse train having a constant average amplitude regardless of input voltage.

INVENTOR
JOSEPH M. MARZOLF

CONSTANT OUTPUT VOLTAGE DC TO DC CONVERTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to constant output voltage DC converters, and more particularly, to an improved constant output voltage DC to DC converter utilizing fewer components than heretofore required.

In conventional static DC to DC converters, the output voltage as well as the operating frequency are directly proportional to the input voltage. Such devices include a rectifier for the output signal and, therefore, and the change in operating frequency due to a variation in the amplitude of the input voltage becomes unimportant except insofar as it affects the efficiency. Since the output voltage of such prior art devices varies with input voltage, any practical device which would be subject to a wide range of input voltages or loads must be provided with some type of voltage regulator. Presently available regulators useful in conjunction with such circuits can be classified as either dissipation or switching types. The dissipation types are very inefficient, losing power in the form of heat dissipation. Switching regulators, on the other hand, are more efficient because the power is either on or off and the regulation is obtained by varying the ratio of the on-to-off time. Many varied constant output voltage converters have been developed employing the principles and circuits described above; however, while such devices have served the purpose, they have not proved satisfactory under all conditions of service due to their complexity and inefficiency of operation. Furthermore, the cost of such prior art devices has been economically prohibitive and has hindered the development of many useful systems.

One approach which has recently proven to be feasible in solving many of the aforementioned problems is described in U.S. Pat. No. 3,219,906. The patented device consists of a balanced square-loop core transformer inverter having the inherent characteristic wherein the product of the applied voltage and the switching time to saturation is constant. The inverter is prevented from running through more than one halfcycle at a time by two silicon controlled rectifiers. These rectifiers are each triggered, at a constant frequency by individual blocking oscillators timed by an additional freerunning multivibrator to a frequency which is lower than the free-running frequency of the inverter. The resulting output signal after full-wave rectification and proper filtering has a constant voltage amplitude regardless of variations of the input voltage used.

The patented device noted above, while being based on a sound and efficient theory and while solving many of the problems encountered by scientists and engineers in this art, requires many complex circuits and numerous component parts to effectuate its advantageous results. Attempts to retain the effective results of such a circuit and reduce the number of required elements have heretofore been unsuccessful.

OBJECTS OF THE INVENTION

It is, therefore, one object of the present invention to provide a simplified DC-to-DC converter.

The invention has an additional object in the provision of an effective DC-to-DC converter which utilizes fewer components than the number of components heretofore required.

A further object is the provision of an efficient DC-to-DC converter utilizing only one switching element to control the inverter.

The present invention has a further object in the provision of an improved DC-to-DC converter utilizing only one constant frequency oscillator in the trigger circuit of the inverter.

SUMMARY OF THE INVENTION

The present invention is summarized in that a constant output voltage DC-to-DC converter comprises a DC power source coupled to energize a constant frequency pulse oscillator which is, in turn, coupled through a pulse amplifier to an unbalanced inverter circuit. The unbalanced inverter generates a single complete cycle of a voltage square wave when triggered by a pulse from the pulse amplifier, the voltage of the cycle being unsymmetrical about a zero voltage reference point. In addition, the inverter includes a transformer and at least two transistors, one of which having all of its electrodes coupled to the transformer through continuously conductive current circuit paths. The converter further has a half-wave rectifier and a filter coupled to the inverter to thereby provide a constant output voltage DC signal.

The invention, therefore, has all the advantages of similar prior art devices while requiring a considerably smaller number of component parts.

The inventive concept and other objects and advantages of the invention will become more fully apparent from the following detailed description of the preferred embodiment thereof when considered in conjunction with the accompanying drawings.

DESCRIPTION OF THE PREFERRED EMBODIMENT

Construction

Figure 1:
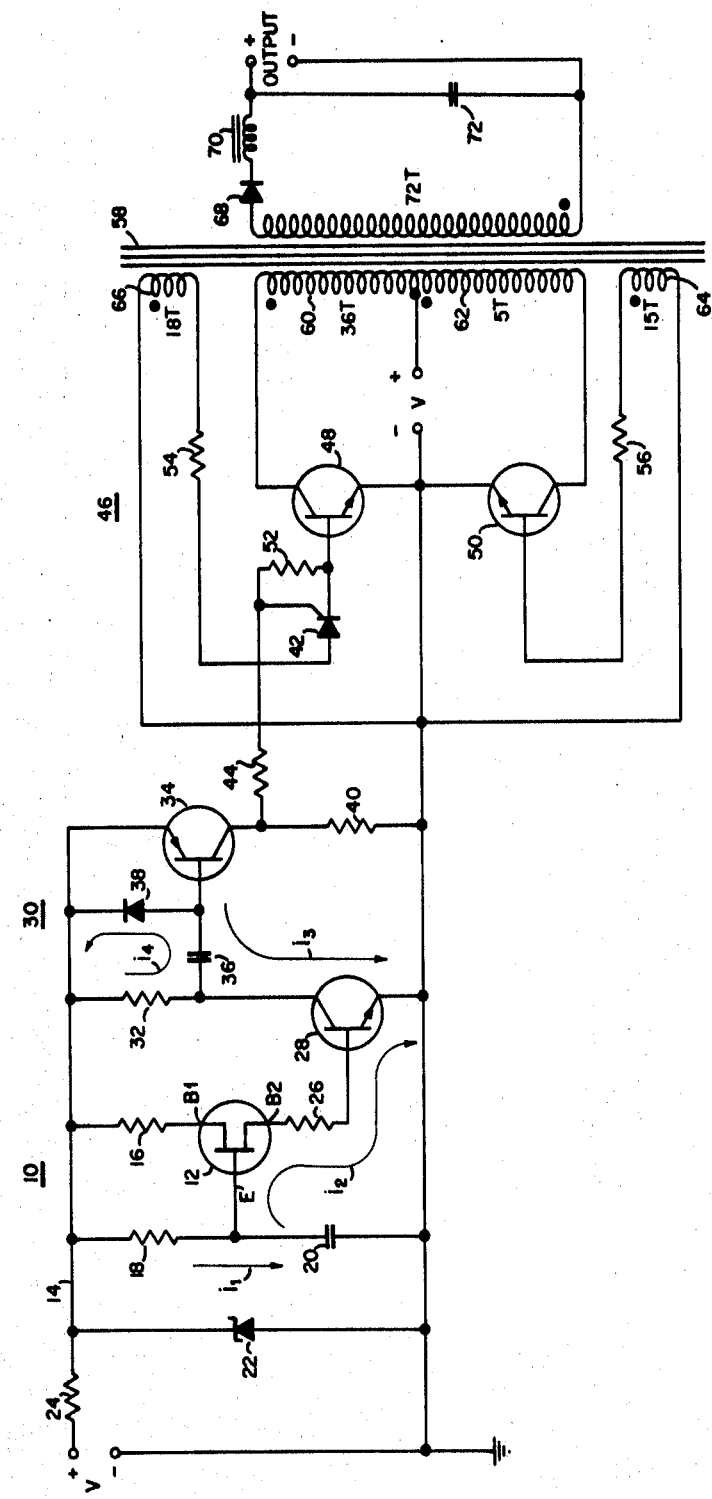
FIG. 1 illustrates a schematic circuit diagram of the preferred embodiment of the invention.

Referring now to FIG. 1, which illustrates the preferred embodiment of the invention, there is shown a pulse oscillator 10 which includes a unijunction transistor 12 having a first base electrode B1 coupled to a positive potential line 14 through a bias resistor 16, and an emitter electrode E coupled to the junction of a bias resistor 18 and a storage capacitor 20. The series network of resistor 18 and capacitor 20 is coupled between positive potential line 14 and ground. Coupled between the system power source $V$ and positive potential line 14 is a Zener diode voltage regulator which includes a Zener diode 22, coupled from line 14 to ground, and a resistor 24, coupled from the positive terminal of power source $V$ to line 14. The Zener diode regulator maintains the voltage on line 14 very nearly constant so that the pulse oscillator 10 will be able to produce a pulse train output signal having a constant frequency. Due to the excellent frequency stability of the unijunction pulse oscillator 10, however, the regulator is normally not required; only where it is desired to produce an extremely constant output voltage signal will use of the Zener diode regulator be necessitated. Accordingly, it is noted that a preferred embodiment of the regulator is included in the description of the present invention solely for the sake of completeness.

The output from pulse oscillator 10 appears on the second base electrode B2 of unijunction transistor 12 and is coupled via a coupling resistor 26 to the base of a first transistor 28 of two-stage pulse amplifier 30. The emitter of transistor 28 is connected to ground, while the collector is coupled to line 14 through a biasing resistor 32 and to the base of a transistor 34 via a capacitor 36. Transistor 34 has its emitter electrode coupled directly to line 14 and a diode 38, the other terminal of the diode 38 being connected to the base of the transistor as illustrated. The collector of transistor 34 is connected to ground by a limiting resistor 40 and is coupled to the control gate of a silicon controlled rectifier 42 by a resistor 44.

The silicon controlled rectifier 42 is part of an unbalanced inverter circuit 46 which further includes identical transistors 48 and 50, resistors 52, 54 and 56, and unbalanced squareloop core transformer 58. As shown in the drawing, the emitter-collector paths of both transistors 48 and 50 are serially coupled across the primary winding of transformer 58. The emitters of both transistors 48 and 50 are further coupled together through power source $V$ to an offcenter tap of the primary winding of transformer 58. It is noted that the dotted end of one section 60 of the primary winding is connected to the collector of transistor 48 while the nondotted end of the other section 62 of the primary winding is coupled to the collector of transistor 50. Thus, as will be explained below, current flow through transistors 48 and 50, respectively, will produce oppositely polarized magnetization states within the core of transformer 58.

The transformer 58 further includes a first feedback winding 64 which is coupled directly across the base-emitter junction of transistor 50 through resistor 56, and a second feedback winding 66 which is coupled across the base-emitter junction of transistor 48 through resistor 54 and the cathode-anode path of silicon controlled rectifier 42. As will be described below, the windings are so polarized as to permit the inverter to cycle through only a single complete cycle when a pulse is produced by pulse oscillator 10. It is noted that resistor 52, as well as resistors 54 and 56, are included in the circuit to establish the operating points for the active elements included therein and may be adjusted or eliminated, in accordance with principles well known in the art, depending upon the particular operational characteristics desired. One end of the secondary winding of transformer 58 is coupled to the anode end of a diode half-wave rectifier 68, the cathode end of which is coupled through a choke coil 70 to an output terminal and through a capacitor 72 to the other end of the secondary winding of the transformer to complete the circuit.

Operation

In operation, the voltage from power source $V$ is coupled to capacitor 20 in pulse oscillator 10 causing the capacitor to alternately charge, through resistor 18 as shown by arrow $i_1$; and discharge, through the emitter-base path of unijunction transistor 12, resistor 26, and the base-emitter junction of transistor 28 to ground as shown by arrow $i_2$. This action produces a pulse spike train which has a constant frequency as shown in curve A of FIG. 2.

The generated pulses are then amplified by two-stage pulse amplifier 30 which includes a capacitor 36 having a charge path from line 14 through the emitter-base junction of transistor 34 and the collector-emitter junction of transistor 28 to ground as shown by arrow $i_3$, and a discharge path from line 14 through resistor 32 and diode 38 back to line 14 as shown by arrow $i_4$. As a result, the pulse spike train appearing at the collector of transistor 34 is an amplified version of that produced by pulse oscillator 10 having the same polarity. This amplified pulse train is then fed to inverter circuit 46.

A pulse from the pulse amplifier when received by the inverter will turn the silicon controlled rectifier 42 on, which thereby establishes a flow of current through transistor 48 and section 60 of the primary winding of the transformer in the direction of the arrow of the emitter of the transistor. Thus, current flows through the primary winding of the transformer, emerging from the dotted end thereof to induce a current flow in the secondary, and feedback windings 64 and 66. In addition, a voltage is generated by transformer action across the feedback windings. This voltage is constant until the core saturates whereupon it goes to zero while the current flowing therethrough begins to increase. At this point transistor 48 cuts off thereby breaking the current path in the upper section 60 of the primary winding of transformer 58. Since the current path in the primary winding is then open, the transformer flux decreases slightly to the point where its hysteresis curve intersects the positive half of the ordinate axis commonly referred to as the positive residual flux point. This flux decrease produces a feedback voltage in winding 64 which is sufficient to initiate a current flow through the collector-emitter path of transistor 50. The current through transistor 50 then causes the transformer to saturate in the opposite direction in a manner similar to that recited above. As noted above, the transformer upon saturation will come to its negative residual flux point, producing a feedback voltage which would normally be sufficient to initiate another cycle of the inverter. However, due to the inhibiting action of silicon controlled rectifier 42, transistor 48 is prevented from turning on again until a subsequent pulse is received.

Thus, the silicon controlled rectifier 42, which is triggered by the amplified pulse train from pulse amplifier 30, inhibits the unbalanced inverter circuit 46 from free-running beyond a single cycle. It is pointed out that the free-running frequency of inverter 46 is higher than the frequency of pulse oscillator 10 so that after being enabled by a pulse spike, the inverter circuit will complete a single cycle before a subsequent pulse spike is generated. The voltage waveform appearing on the secondary winding of transformer 58 therefore has the general configuration of solid curve 74 of graph B of FIG. 2. The positive segment of each cycle of curve 74 is produced when transistor 48 is conductive while the negative portion is produced when transistor 50 is conductive. It is noted at this point that the unbalanced design of the inverter circuit produces an unsymmetrical waveform in which the larger positive section produces all of the useful output power while the negative portion of the cycle is used only to reset the square-loop core of the transformer for subsequent triggering. This design lends itself to the use of a half-wave rectifier rather than a full-wave rectifier and, accordingly, simplifies the circuit. As can be seen by comparing graphs A and B of FIG. 2, the inverter completes only one complete cycle each time a pulse spike is generated, the cycle being completed prior to the generation of a subsequent pulse spike.

Turning now to an explanation of the voltage regulation aspect of the invention, reference will be made to graph B of FIG. 2. Curve 74 of graph B is produced when the input voltage generated by power source $V$ is at one particular value. If the input voltage should change, the output of the inverter 46 will correspondingly change as shown by dotted curve 76. Due to the well-known constant pulse length-amplitude product which characterizes square-loop core transformer inverters of the general type employed herein, the area under the two curves 74 and 76 will be equal. Thus, regardless of the value of the input voltage used, the average output voltage per cycle appearing at the secondary of transformer 58 will remain constant. By permitting only a single cycle to be generated by the inverter during each of successive number of equal time intervals, as provided by the present invention and as illustrated in graph B of FIG. 2, the average output voltage over time becomes constant.

Figure 2A:
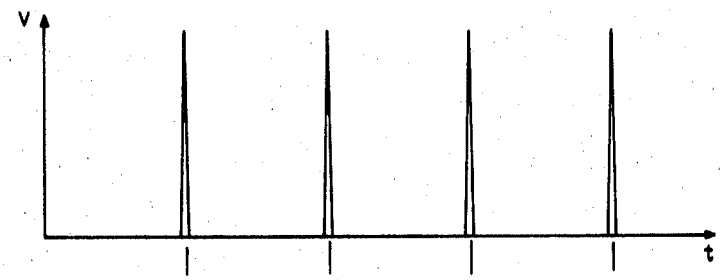
FIGS. 2A, 2B and 2C show a set of curves used to illustrate the principles of operation of the embodiment of the circuit illustrated in FIG. 1.
Figure 2B:
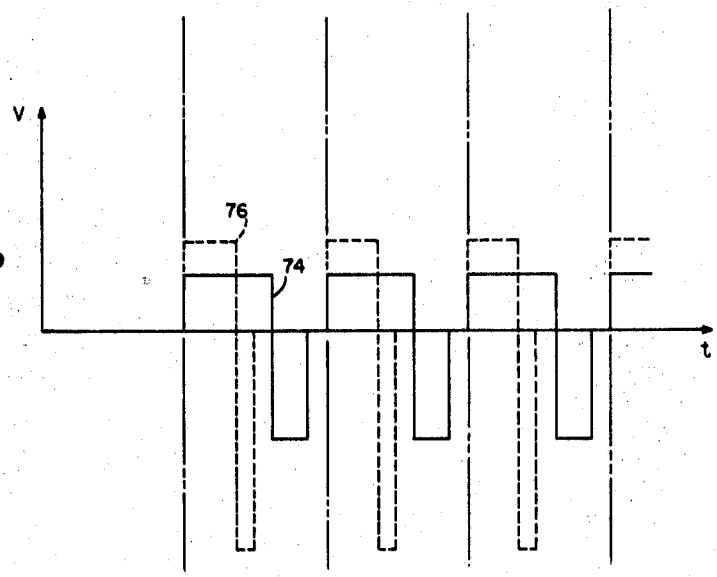
Figure 2C:
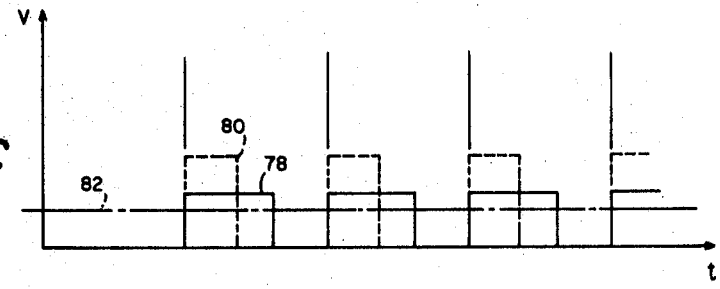

Referring to graph C of FIG. 2, curves 78 and 80 correspond to curves 74 and 76, respectively, of graph B and represent the rectified voltage waveforms appearing at the junction of the cathode of diode 68 and choke coil 70. The average voltage, represented by curve 82, appears at the system output after being filtered by coil 70 and capacitor 72.

Thus, by utilizing only one pulse oscillator, and only a single silicon controlled rectifier in conjunction with an unbalanced square-loop core transformer inverter, a simple, yet efficient DC-to-DC converter having a constant DC voltage output is provided at reduced cost and complexity.

It should be understood, of course, that the foregoing disclosure relates to only a preferred embodiment of the invention and that numerous modifications or alterations may be made thereto in light of the above teachings.

I claim:
1. A constant output voltage DC converter, comprising:
    a DC power source;
    a constant frequency pulse oscillator coupled to said power source for energization thereby;
    a pulse amplifier coupled to said pulse oscillator;
    unbalanced inverter means coupled to said power source and said pulse amplifier, for generating a single complete cycle of a voltage square wave when triggered by a pulse from said pulse amplifier, the voltage of said cycle being unsymmetrical about a zero voltage reference point, said inverter means including a transformer and at least two transistors, one of said transistors having all of its electrodes coupled to said transformer through continuously conductive current circuit paths, and a silicon controlled rectifier;

a half-wave rectifier coupled to said inverter means for providing an output voltage signal having a constant average magnitude; and a filter circuit coupled to said half-wave rectifier for providing a constant output voltage DC signal, wherein said constant frequency pulse oscillator includes:

a storage device; and a unijunction transistor having a first base electrode coupled to said DC power source, an emitter electrode coupled to both said DC power source and said storage device and a second base electrode coupled to said pulse amplifier, wherein said pulse amplifier includes:

a first transistor having a base electrode capacitively coupled to the second base electrode of said unijunction transistor, an emitter electrode coupled to said storage device, and collector electrode coupled to said DC power source; and a second transistor having a base electordecapacitivey coupled to the collector electrode of said first transistor, an emitter electrode coupled to said DC power source, and a collector electrode coupled to the control electrode of said silicon controlled rectifier of said unbalanced inverter means.

2. The invention as recited in claim 1, wherein said unbalanced inverter means silicon controlled rectifier has a control electrode coupled to said pulse amplifier, a cathode coupled to the other one of said two transistors, and an anode coupled to said transformer.

3. The invention as recited in claim 2, wherein said transformer comprises an unbalanced square-loop core transformer having a primary winding which includes an offcenter tap, a secondary winding, and two unequal feedback control windings.

4. The invention as recited in claim 3, wherein one end of the primary winding of said transformer is coupled to a collector electrode of the other one of said transistors, the other end of said primary winding is coupled to a collector electrode of said one of said transistors, and the offcenter tap of said primary winding is coupled to emitter electrodes of both of said transistors.

5. The invention as recited in claim 4, wherein one of the feedback control windings of said transformer is coupled between base and emitter electrodes of said one of said transistors, and the other of said feedback control winding is coupled between the anode of said silicon controlled rectifier and the emitter of said other one of said two transistors.

6. The invention as recited in claim 5, wherein said constant frequency pulse oscillator further includes a Zener diode voltage regulator coupled between said DC power source and both the first base and emitter electrodes of said unijunction transistor.

7. The invention as recited in claim 6 wherein:

said first and second transistors of said pulse amplifier are of opposite conductivity type; and said pulse amplifier further includes a diode coupled between the base and emitter electrodes of said second transistor.

8. The invention as recited in claim 7, wherein said half-wave rectifier comprises a single diode coupled to the secondary winding of said transformer.